(12) United States Patent
Hong et al.

(10) Patent No.: US 8,155,218 B2
(45) Date of Patent: Apr. 10, 2012

(54) FREQUENCY DOMAIN EQUALIZATION FOR TIME VARYING CHANNELS

(75) Inventors: Een-Kee Hong, Seongnam-Si (KR); Le Nam Tran, Yongin-Si (KR); Peter Gaal, San Diego, CA (US)

(73) Assignee: Qualcomm Incorporated

( * ) Notice: Subject to any disclaimer, the term of this patent is extended or adjusted under 35 U.S.C. 154(b) by 1051 days.

(21) Appl. No.: 12/049,236

(22) Filed: Mar. 14, 2008

(65) Prior Publication Data

US 2008/0225936 A1 Sep. 18, 2008

Related U.S. Application Data

(60) Provisional application No. 60/895,452, filed on Mar. 17, 2007, provisional application No. 60/895,583, filed on Mar. 19, 2007.

(51) Int. Cl.
*H04L 27/28* (2006.01)
*H04L 27/06* (2006.01)
*H04B 1/10* (2006.01)

(52) U.S. Cl. .................. 375/260; 375/340; 375/350

(58) Field of Classification Search ................ 375/229, 375/232, 233, 260, 267, 285, 350, 340
See application file for complete search history.

(56) References Cited

U.S. PATENT DOCUMENTS

| | | | |
|---|---|---|---|
| 7,099,299 B2 | 8/2006 | Liang et al. | |
| 7,324,591 B2 | 1/2008 | Fimoff et al. | |
| 7,421,020 B2 | 9/2008 | Kang et al. | |
| 7,619,964 B2 * | 11/2009 | Son et al. | 370/210 |
| 7,826,576 B1 * | 11/2010 | He et al. | 375/350 |
| 2004/0021795 A1 * | 2/2004 | Kim | 348/607 |
| 2004/0114506 A1 * | 6/2004 | Chang et al. | 370/208 |
| 2005/0286625 A1 | 12/2005 | Jung | |
| 2006/0120267 A1 | 6/2006 | De Bart et al. | |

FOREIGN PATENT DOCUMENTS

| | | |
|---|---|---|
| KR | 20060022684 A | 3/2006 |
| WO | WO2004110002 | 12/2004 |

OTHER PUBLICATIONS

Onggosanusi, et al. "Derivation of Channel Estimation Error Model for CDMA EM Evaluation Methodology", 3rd Generation Partnership Project 2, Texas Instruments Incorporated, Dec. 6, 2004, 5 pages.
Bin Cai et al., "A Novel Channel Estimation Method for SC-FDE Over Fast Fading Channels" International Conference on Communication Technology, (Nov. 1, 2006). pp. 1-4, IEEE, PI, XP031071979.
International Search Report and Written Opinion—PCT/US08/057291, International Searching Authority—European Patent Office, Dec. 16, 2008.
Li, et al., "Channel estimation and interference cancellation in CP-CDMA systems" IET Communications, vol. 1, No. 1, Feb. 1, 2007, pp. 106-112, XP006028089.

(Continued)

*Primary Examiner* — Don N Vo

(57) ABSTRACT

Systems and methods for a wireless communication system are provided. The method includes estimating a time-variation of a channel through which the wireless communication system transmits. This also includes decreasing the estimated time-variation of the channel from a signal transmitted by the wireless communications system.

35 Claims, 11 Drawing Sheets

OTHER PUBLICATIONS

Madhukumar, et al., "Cyclic prefix assisted code division multiple access communications sytems: a new approach for high-rate data transmission" International Conf. on Information Communications and Signal Processing and Fourth Pacific Rim Conference on Multimedia, vol. 1, Dec. 15, 2003, pp. 650-654, XP010701029, Piscataway, NJ, USA.

Partial International Search Report—PCT/US08/057291, International Search Authority European Patent Office—Sep. 3, 2008.

Sang-Yick Leong et al., "Fast Time-Varying Dispersive Channel Estimation and Equalization for 8-PSK Cellular System" IEEE Global Telecommunications Conference, vol. 5, (Dec. 1, 2003), pp. 2421-2425, New York, NY: IEEE. US, XP010678582.

Schniter P et al., "Iterative Frequency-Domain Equalization for Single-Carrier Systems in Doubly-Dispersive Channels" Asilomar Conference on Signals, Systems and Computers, vol. 1, (Nov. 7, 2004), pp. 667-671, Piscataway, NJ, USA, IEEE, XP010779881.

Tran, et al., "New hybrid decision feedback equalization for DS-CDMA systems" Wireless Communications and Networking Conference, Mar. 1, 2007, pp. 493-498, XP031088581, IEEE, PI.

Translation of Office Action in Korean application 10-2009-7021773 corresponding to U.S. Appl. No. 12/049,236, citing KR20060022684 and TRAN_et_al_pp_493_498_XP031088581_year_2007 dated Jan. 11, 2011.

Vook F. W. et al., "Transmit Diversity Schemes for Broadband Mobile Communication Systems" Vehicular Technology Conference, vol. 6, (Sep. 24, 2000), pp. 2523-2529, Piscataway, NJ, USA, IEEE, XP010525049.

Taiwan Search Report—TW097109415—TIPO—Jun. 4, 2011.

* cited by examiner

FREQUENCY DOMAIN EQUALIZATION FOR TIME VARYING CHANNELS

CROSS REFERENCE TO RELATED APPLICATION

This application claims the benefit of U.S. Provisional Patent Application No. 60/895,452, entitled FREQUENCY DOMAIN EQUALIZATION FOR TIME VARYING CHANNELS, and filed on Mar. 17, 2007, the entirety of which is incorporated herein by reference. This application also claims the benefit of U.S. Provisional Patent Application No. 60/895,583, entitled FREQUENCY DOMAIN EQUALIZATION FOR TIME VARYING CHANNELS, and filed on Mar. 19, 2007, the entirety of which is also incorporated herein by reference.

BACKGROUND

I. Field

The following description relates generally to communications systems, and more particularly to applying frequency domain equalization in the presence of time-varying channels while mitigating effects of such channels.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-single-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized.

A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Recently, frequency domain equalization (FDE) has been investigated to compensate for the impairments of multi-path channels having long impulse response. By transforming operations in the time domain into the frequency domain, FDE can reduce receiver complexity. The development of the FDE is based on the correspondence between the circular convolution of two sequences in the time domain and the element-wise product of their frequency responses. If the information data are forced to be periodic and the channel is assumed to be static during the transmission of one block of data (referred to as quasi-static channels), then the received signal's spectrum is identical to the product of the frequency response of the channel and the spectrum of transmitted data. However, the equivalence between time domain and frequency domain is no longer true if the channel is not static. The non-equivalence due to a time-varying channel degrades the performance of FDE. As a result, FDE is not effective to combat the distortion caused by time-varying channels.

In spite of the degradation in performance in time varying channels, FDEs are applied under an implicit assumption that the time-varying channel is actually static, without correcting for channel time-variation.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

An iterative process and components are provided to allow efficient and accurate frequency domain equalization for a multiple-in-single-out or a multiple-in-multiple-out (MIMO) system. Various processing components removes or mitigates components of channel variation and recovers a circular convolution, in order that frequency domain equalization (FDE) structures developed for static channels become effective in time-varying channels. Thus, Bit Error-Rate (BER) performance of frequency domain equalization in time varying channels is improved. Wireless signals are initially processed by input components such as Fast Fourier Transforms where an initial frequency domain equalization is performed. The received wireless signals are transformed from time domain to the frequency domain via a P-point Discrete Fourier Transform for example to determine a baseline value for the frequency domain equalization. For time varying channels, however, a vector $\beta$ is determined which represents a degradation of the corresponding equivalence between the time domain and the frequency domain which is relied upon by the frequency domain equalization. Thus, a time variation cancellation process is performed where $\beta$ is iteratively subtracted from the frequency domain equalization. In this manner, frequency domain equalization performance is improved in the presence of time varying channels.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate frequency domain equalization in a wireless communications system. In an aspect, a method for a wireless communication system is provided. The method includes estimating a time-variation of a channel through which the wireless communication system transmits. This also includes decreasing the estimated time-variation of the channel from a signal transmitted by the wireless communications system. In an aspect, time variation components can be iteratively subtracted from frequency domain equalization computations.

Furthermore, various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Figure 1:
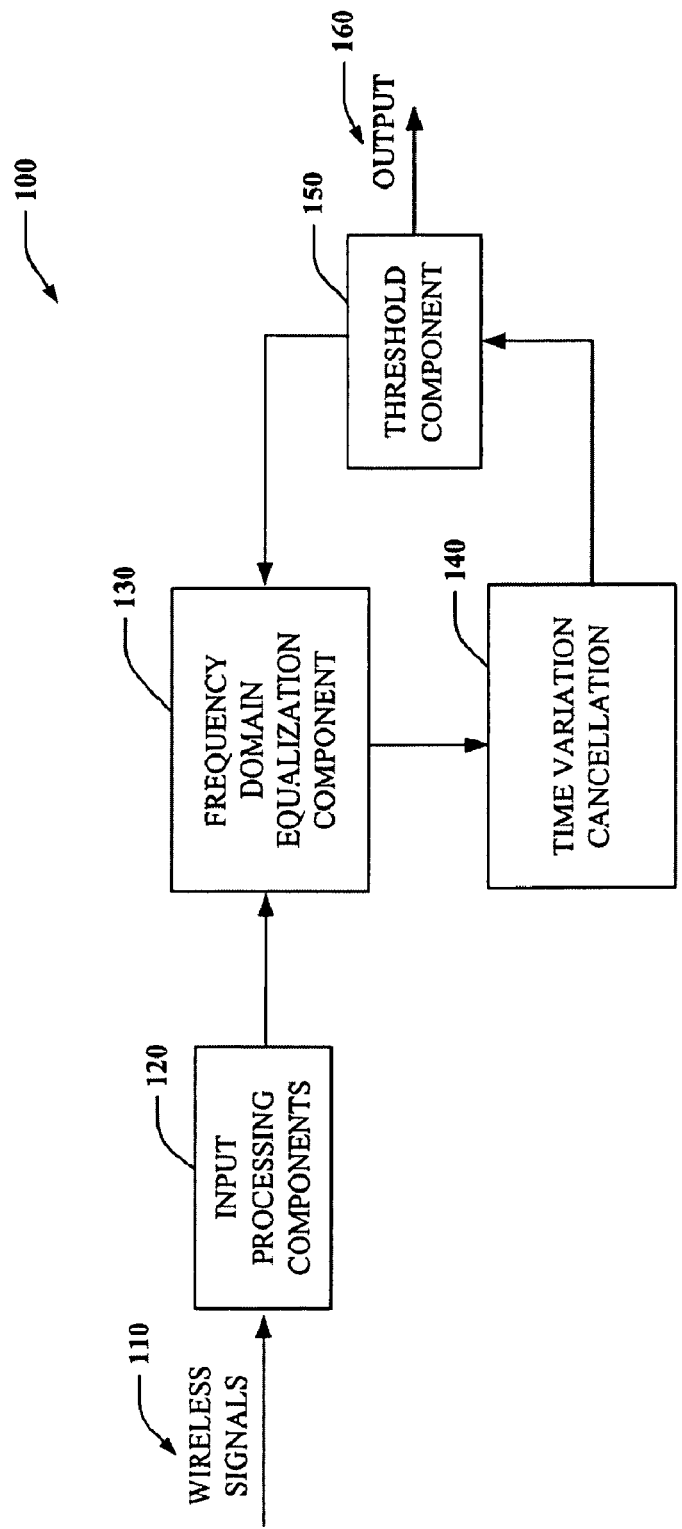
FIG. 1 is a high level block diagram of a system that is provided to illustrate frequency domain equalization in a communications environment.

Referring now to FIG. 1, a system 100 illustrates frequency domain equalization for a communications environment. The system 100 provides an iterative or multi-step process where components are provided to allow efficient and accurate frequency domain equalization for a multiple-in-single-out or a multiple-in-multiple-out (MIMO) system (or other type systems described below). Various processing components removes, mitigates, or decreases components of channel variation and recovers a circular convolution, in order that frequency domain equalization (FDE) structures developed for static channels become effective in time-varying channels. Thus, Bit Error-Rate (BER) performance of frequency domain equalization in time varying channels is improved. Wireless signals 110 (including symbols and other structures) are initially processed by input processing components 120 such as Fast Fourier Transforms where an initial frequency domain equalization (FDE) is performed by a frequency domain equalization component 130. The received wireless signals 110 are transformed from time domain to the frequency domain via a P-point Discrete Fourier Transform for example to determine a baseline value for the frequency domain equalization at 130.

For time varying channels, however, a value β is determined which represents a degradation of the corresponding equivalence between the time domain and the frequency domain which is relied upon by the frequency domain equalization component 130. A time variation cancellation component 140 removes or decreases the effects of β by iteratively subtracting β from the frequency domain equalization at 130. In this manner, frequency domain equalization performance is improved in the presence of time varying channels. As shown, a threshold component 150 is employed to determine when the effects of β have been reduced, decreased, or minimized to a desired value. For instance, when signal quality or other performance parameter is above or below a desired value set by a threshold value. After β has been reduced to a desired value, output 160 is produced for the respective receiver (shown and described below).

In an aspect, the system 100 decreases the component of channel variation and recovers the circular convolution, so that the FDE structures developed for static channels become effective in time-varying channels. According to an aspect, the Bit Error-Rate (BER) performance of frequency domain equalization in time varying channels is improved. Time-varying channels produce signal variations resulting in substantial degradation of FDE implementation. The received signal in time domain is given by:

$$r_n = \sum_{l=0}^{\rho} h_l(n) s_{n-\tau_l} + \eta_n, \tag{1}$$

where
ρ denotes the number of propagation paths.
$h_l(n)$ is the channel coefficient of l-th path at time index n in the block.
$\tau_l$ is the delay of the l-th path relative to the first path.
$\{s_n\}$ is the sequence of transmitted signals. For the use of FDE, $\{s_n\}$ is forced to be periodic by cyclic prefix or unique word extension.
$\{r_n\}$ is the received signal.
$\{\eta_n\}$ is the received noise and other interference.

To transform the received signals 110 into frequency domain, a P-point Discrete Fourier Transform (DFT) is applied to received signals $\{r_n\}$, which yields $$R_k = \sum_{n=0}^{P-1} r_n e^{-j2\pi kn/P} \qquad (2)$$

$$= \sum_{n=0}^{P-1}\sum_{l=0}^{\rho-1} h_l(n)s_{n-\tau_l}e^{-j2\pi kn/P} + \sum_{n=0}^{P-1} \eta_n e^{-j2\pi kn/P}$$

If the channel is static for the duration of the DFT processing block, $h_l(n)$ is independent of n. However, the values of $h_l(n)$ are changed for time-varying channel in Eq. (2) above. The term $h_l(n)$ can be decomposed in terms of the time-invariant and time-variant quantity, as follows:

$$h_l(n)=h_l(0)+f_l(n) \qquad (3)$$

where
 $h_l(0)$ denotes the value of channel gain of l-th path at time index zero in the data block. This term represents the constant (time-invariant) component of channel impulse response in one block.
 $f_l(n)$ is the difference between channel coefficients at time n and time zero of the l-th path. This term represents the amount of time variation at time n from time zero of the l-th path. Computation of $f_l(n)$ can be inferred from (3) ($f_l(n)=h_l(n)-h_l(0)$) if one can estimate the values of $h_l(n)$ and $h_l(0)$.

From equations (2) and (3) above, the received signal in the frequency domain can be written as:

$$R_k = \alpha + \beta \qquad (4)$$

$$\alpha = \sum_{n=0}^{P-1}\left(\left(\sum_{l=0}^{\rho-1} h_l(0)s_{n-\tau_l}\right) + \eta_n\right)\cdot e^{-j2\pi kn/P}$$

$$\beta = \sum_{n=0}^{P-1}\left(\sum_{l=0}^{\rho-1} f_l(n)s_{n-\tau_l}\right)\cdot e^{-j2\pi kn/P}$$

The first term, $\alpha$ of the right side in equation (4) can be simplified as follows:

$$\alpha = \sum_{n=0}^{P-1}\sum_{l=0}^{\rho-1} h_l(0)s_{n-\tau_l}\cdot e^{-j2\pi kn/P} + \sum_{n=0}^{P-1} \eta_n\cdot e^{-j2\pi kn/P} \qquad (5a)$$

Next, the notation is changed slightly by assuming that the channel path delays $\tau_l$ are aligned with the time sample points, thus substitute $\tau_l$ with l in equation (5b).

$$\alpha = \sum_{n=0}^{P-1}\sum_{l=0}^{\rho-1} h_l(0)s_{n-l}\cdot e^{-j2\pi kn/P} + \sum_{n=0}^{P-1} \eta_n\cdot e^{-j2\pi kn/P} \qquad (5b)$$

It is noted that while in practice the path delays are typically not aligned with the time samples, one can decompose non-aligned paths to multiple aligned sub-paths to get a similar end result. Therefore, the notation change does not reduce generality of the description. Thus, $\rho$ still represents the number of paths but $\rho$ from this point is understood to mean the total number of sample points covering the delay spread of the channel, including the sub-path decomposition mentioned above. Since $\{s_n\}$ is periodic, the following equalities, are true.

$$\sum_{n=0}^{P-1} s_{n-l}e^{-j2\pi k(n-l)/P} = \sum_{n=0}^{P-1} s_n e^{-j2\pi kn/P} = S_k \qquad (4)$$

Thus, $\alpha$ is rewritten as:

$$\alpha = H_k S_k + N_k \qquad (5)$$

where $$H_k = \sum_{l=0}^{\rho-1} h_l(0)e^{-j2\pi kl/P} \qquad (6)$$

$$N_k = \sum_{n=0}^{P-1} \eta_n e^{-j2\pi kn/P}$$

The second term, $\beta$ in equation (4), can be written by:

$$\beta = \sum_{n=0}^{N-1}\sum_{l=0}^{\rho-1} f_l(n)s(n-l)e^{-j2\pi kn/N} \qquad (7)$$

$$= \sum_{l=0}^{\rho-1}\sum_{n=0}^{N-1} f_l(n)s(n-l)e^{-j2\pi kn/N}$$

For:

$$F_k^{(l)} = \sum_{n=0}^{N-1} f_l(n)s_{n-l}e^{-j2\pi kn/N} \qquad (8)$$

which is a discrete Fourier transform of the product of two sequences $\{f_l(n)\}$ and $\{s_{n-l}\}$ where the compact expression of equation (4) can be given by:

$$R_k = \alpha + \beta \qquad (11)$$
$$\alpha = H_k S_k + N_k$$
$$\beta = \sum_{l=0}^{\rho-1} F_k^{(l)}$$

If the channel is assumed to be constant within one DFT processing block period (e.g., $f_l(n)=0$), $\beta$ can vanish and the correspondence between the convolution in the time domain and the element-wise product in the frequency domain holds. Thus, the concept of frequency domain equalization can be applied. For the time-varying channel, $\beta$ destroys the corresponding equivalence between time domain and frequency domain and the performance of frequency domain equalization can be degraded. The value of quantity $\beta$ is dependent on the amount of channel variation. Thus, as mobility increases, $\beta$ has significant value.

It is desired to eliminate or substantially reduce this term, $\beta$, due to time variation of channel but doing so requires a priori knowledge of transmitted signals $s_n$, as well as channel coefficients. As will be described in more detail below with respect to FIG. 2, an exemplary aspect of multi-step equalization is employed to reduce the impact caused by time variation of the channel. Other methods of estimating and eliminating $\beta$ can also be employed.

For time varying channels, the frequency domain equalization is not conceptually applicable due to the presence of $\beta$ in equation (11) since the frequency response of received signals is generally no longer equal to the product of frequency responses of transmitted signals and channel impulse response. It is desirable to eliminate or mitigate β so that FDE can be efficiently processed. From equations (9) and (10) above, the computation of β employs the following:

The values of $\{f_i(n)\}$: This can be obtained by a channel estimation method. Thus, with a given channel estimation algorithm, one can obtain $h_i(n)$ and $h_i(0)$. An estimate of $f_i(n)$ can be given by:

$$f_i(n)=h_i(n)-h_i(0) \tag{9}$$

The values of transmitted sequence $\{s_{n-l}\}$: In practice, these values are not known; however, the tentative signal estimates that are obtained by applying FDE to the time-varying channel without any treatment for time-variant components can be used.

As noted above, estimating β can be performed via other techniques. For example, the known pilot tone can be subtracted from the pilot part of signals carrying pilot tones, so as to estimate the time-variation to the signal. The pilot tone is known, and so is a good source for an estimate of, β, but comprises a small fraction of the total signal, notably not including data-carrying portions of the signal, and so is an estimate of β for less relevant portions of the signal to the actual decoding of data.

Another aspect in two steps can also be provided. In the first step, the frequency domain equalization is performed for time-varying channels to acquire tentative estimates of transmitted signals. With these tentative detected symbols and a channel estimation, the cancellation of β is possible. In the second step, after cancellation of β, the frequency domain equalization is performed at least a subsequent time.

It is noted that the system 100 can be employed with an access terminal or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
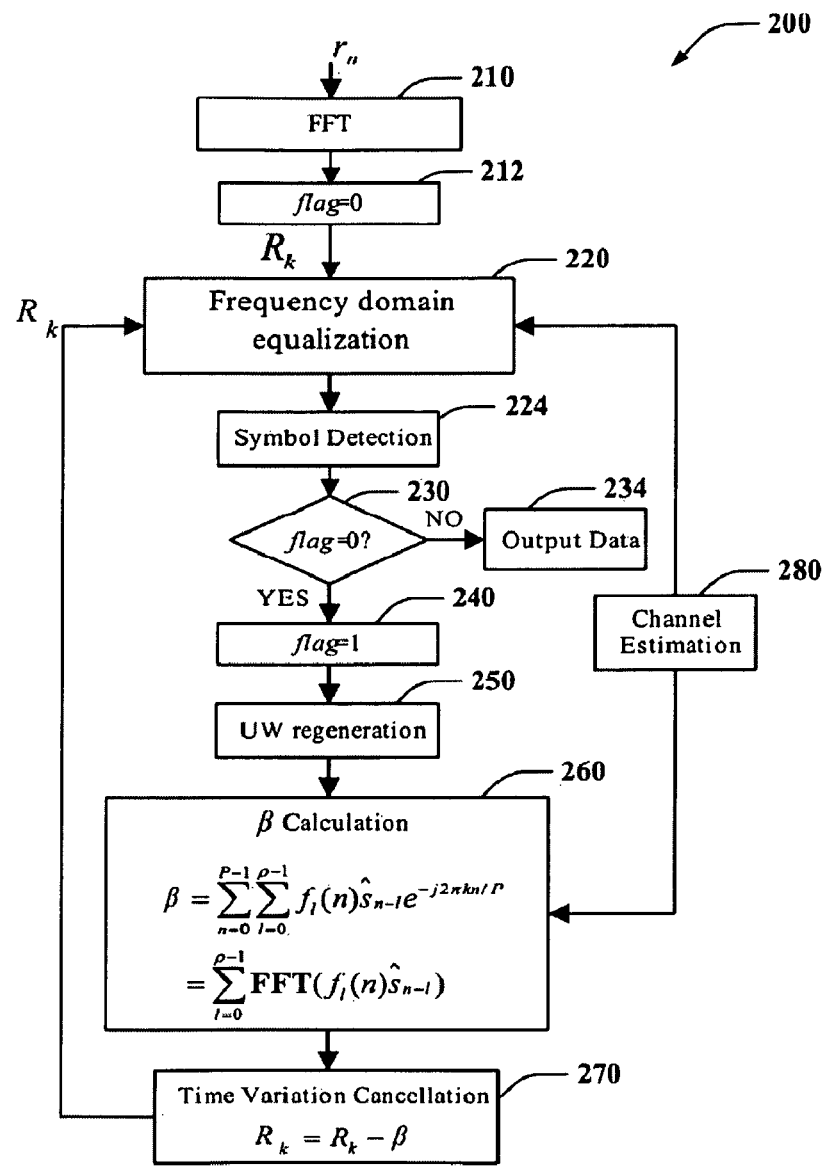
FIG. 2 is a high level flow diagram of a frequency domain equalization methodology.

Referring now to FIG. 2, a frequency domain equalization methodology 200 is illustrated. While, for purposes of simplicity of explanation, the methodology (and other methodologies described herein) is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Before proceeding with the detailed methodology 200, some general frequency domain process acts are described:

Act 1: Apply FDE for time-varying channels to obtain tentative symbol estimates $\{\hat{s}_n\}$. This produces tentative estimates of transmitted signals. Thus, substantially any type of frequency domain equalization structures can be involved at this point. Since frequency domain equalization is applied to a time varying channel rather than the time invariant channel, erroneous symbol estimates can occur.

Act 2: Compute β from the tentative symbol estimates in act 1.

$$F_k^{(l)} = \sum_{n=0}^{N-1} f_l(n)\hat{s}_{n-1} e^{-j2\pi kn/N} \tag{10}$$

$$\beta = \sum_{l=0}^{P-1} F_k^{(l)}$$

Act 3: Subtract β from $R_k$ in equation (4) above. If the estimation of β is acceptable, $R_k$ will become α. However, one can not achieve ideal data detection in step 2 and the partial amount of interference term is removed.

$$R_k = R_k - \beta \tag{11}$$

Act 4: Apply frequency domain equalization to $R_k$ computed in Act 3 to obtain symbol estimates. This act is similar to act 2. Since the impact of β is partially reduced, improved symbol estimates are achieved in this act. Therefore, the overall performance of frequency domain equalization is improved.

Now referring to FIG. 2, a detailed process 200 is illustrated that is similar to the general acts one through four described above. Proceeding to 210 of process 200, an FFT is performed on incoming wireless signals $r_n$ in order to transform the signals from the time domain into the frequency domain. At 212, an iteration flag is reset to zero and such flag will be examined to determine when the process 200 has completed (e.g., a threshold condition has been met). At 220, frequency domain equalization is performed on the transformed data from 210. At 224, a symbol detection sequence is performed. This sequence can cause the flag of 212 to change states. A test is performed at 230 to determine whether or not the flag has changed states. If the flag has changed states, (e.g., flag still zero), the process 200 ends and equalized data is output at 234. If the flag has not changed states at 230 (e.g., flag=0), the process proceeds to 240 to set the flag to 1. In this case, this allows the process 200 to execute two times.

It is to be appreciated however that the process 200 could execute more than twice if desired. For instance, a threshold for signal quality or other parameter could be set up where the execution flag did not change until the desired quality. Also, the test at 230 could be for a higher flag number than one which would permit the process 200 to execute more times. At 250, a unique word is generated where data prefixes and suffixes can be attached to the process data. This type of data helps the performance of an FFT by making a given signal appear to be periodic. Cyclic prefixes can also be employed at 250. At 260, a β calculation is performed as previously described above. At 270, a time variation cancellation is performed where β is subtracted from previous frequency domain equalization computations. After the cancellation, the process proceeds back to 220 for a subsequent frequency domain equalization. It is noted, that a channel estimation is performed at 280 (e.g., during initial processing or background) and employed by the process 200.

Figure 3:
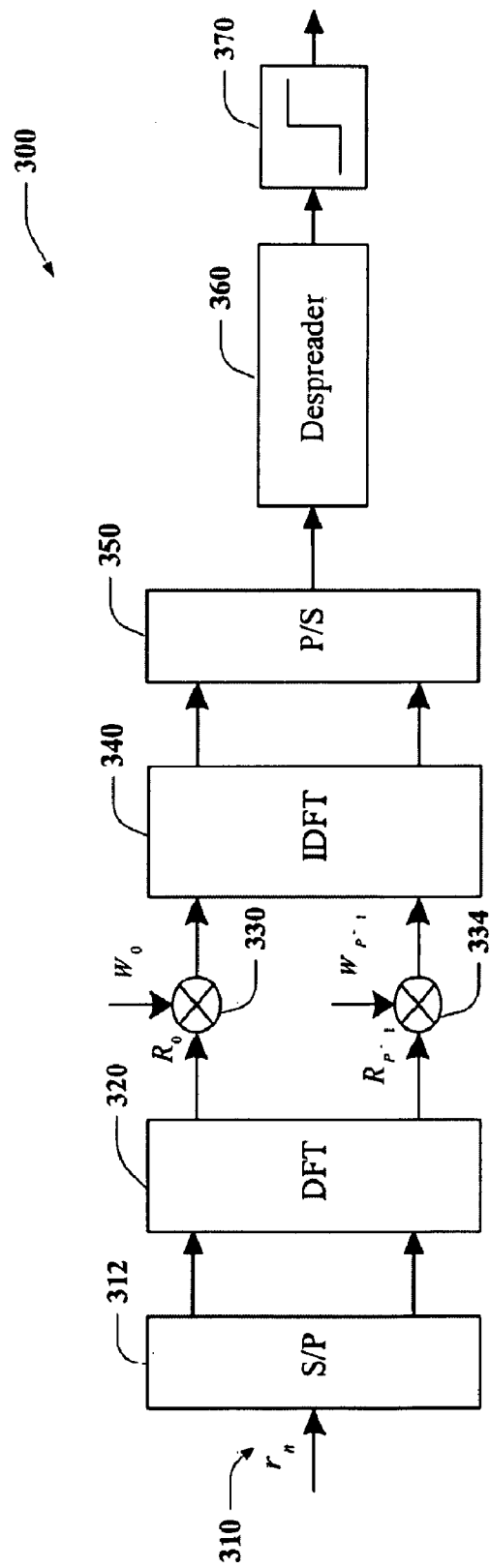
FIGS. 3 and 4 are example processing systems for frequency domain equalization.
Figure 4:
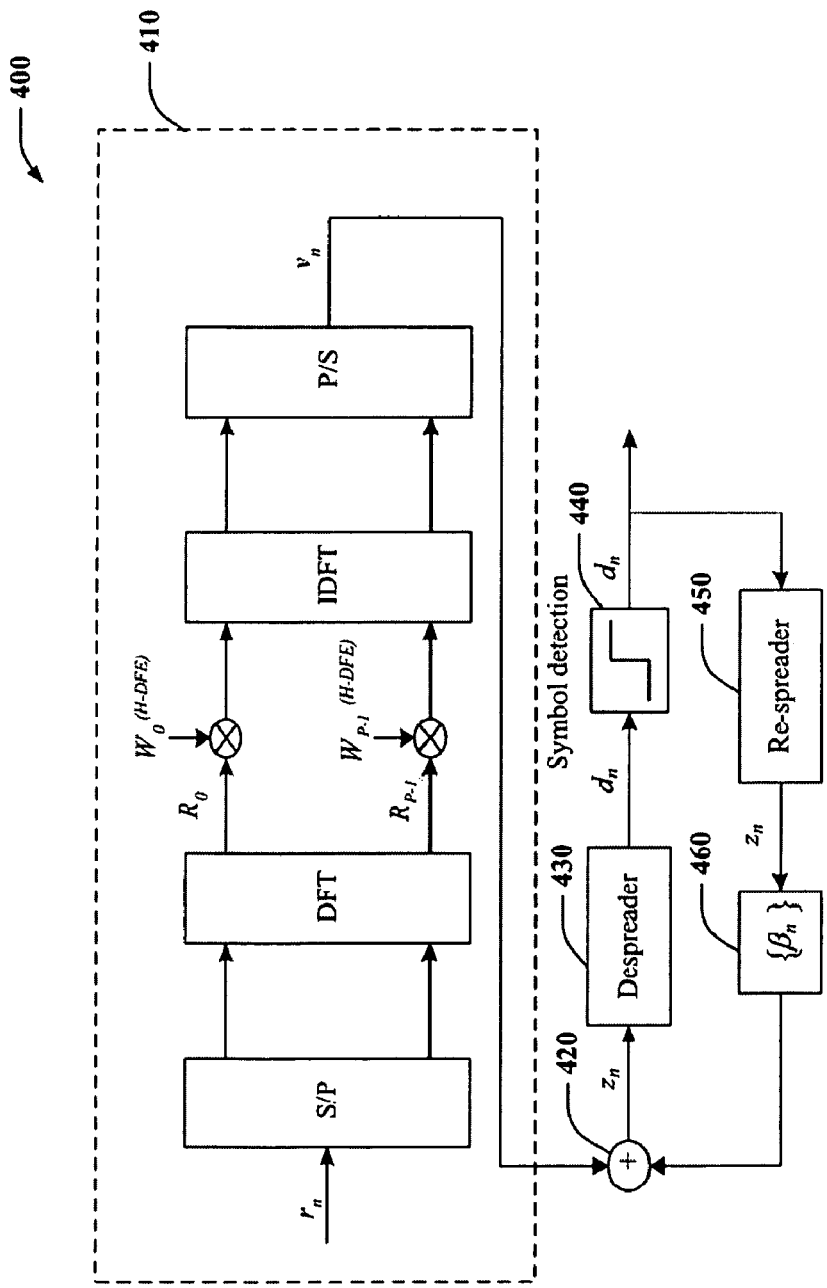

Now referring to FIGS. 3 and 4 collectively, example systems 300 and 400 illustrate frequency domain equalization processing in accordance with the components and methods described above. With respect to FIG. 3, received wireless signals 310 are processed via a serial to parallel converter 312 and transformed via a DFT component 320. Phase and amplitude adjustments are made at 330 and 334 before an IDFT is performed at 340. A parallel to serial converter is employed to at 350, where a de-spreader 360 produces output 370. With respect to FIG. 4, a hybrid approach is illustrated. Processing block 410 provides similar functionality described for FIG. 3. A feedback element is added where output from the processing block 410 is summed with other processed data at 420. A de-spreader 430 produces intermediate output 440 that is feedback to the summer component 420 via re-spreader component which produces β 460 which is ultimately subtracted at 420 from the frequency domain equalization output from block 410. The following description provides additional context for the systems 300 and 400 illustrated in FIGS. 3 and 4.

In an aspect, the performance of the methods described above for frequency domain equalization (FDE) in time-varying channels can be evaluated using computer simulation. For example, a DS-CDMA system is an exemplary system considered in the simulation. Aspects can be applied to non-spread spectrum systems as well. Channel B of the vehicular environment as described in Recommendation ITU-R M.1225 is considered. The chip rate is selected to be 3.6864 Mbps as in 3× cdma2000; the delay between multi-paths is assumed to be an integer multiple of the basic chip interval (1/3.6864 Mcps≈271 ns); and the power delay profile for the six independent paths of the modified channel B is listed in Table 1 below. Assume an ideal channel estimation and consider the performance of an un-coded system using QPSK modulation. A 16-ary Walsh code is used as a spreading code. With an FFT size of 1024, the number of modulated symbols in one transmission block is 64. The maximum excess delay of channel B extends to 20054/271=74 chips and a PN sequence of 80 chips is inserted into each data block. Consequently, the number of information-bearing symbols is 59. Simulation parameters are summarized in the Table 2 below.

TABLE 1

Tapped-delay-line parameters for vehicular environment

| Tap | Relative delay (ns) | Average Power | Doppler Spectrum |
|---|---|---|---|
| 1 | 0 | −2.5 | Classic |
| 2 | 271 | 0 | Classic |
| 3 | 8943 | −12.8 | Classic |
| 4 | 13008 | −10.0 | Classic |
| 5 | 17073 | −25.2 | Classic |
| 6 | 20054 | −16.0 | Classic |

TABLE 2

Simulation parameters

| Parameters | Value |
|---|---|
| FFT size | 1024 |
| Spreading factor | 16 |
| Modulation | QPSK |
| Carrier frequency | 2 GHz |

Performance improvement has been demonstrated for the algorithm with frequency domain linear equalization (FD-LE) and hybrid decision feedback equalization (HDFE). The FD-LE configuration for DS-CDMA is shown in FIG. 3.

The linear equalization coefficients $\{W_k\}$ are given by $$W_k = \frac{H_k^*}{|H_k|^2 + \sigma_n^2} \quad (12)$$

where $\{H_k\}$ is DFT of channel impulse response, and $\sigma_n^2$ is the white noise variance.

One possible realization of DFE in FD is a hybrid structure, in which the feed-forward filter is performed in the frequency domain and the feedback filter is implemented in the time domain. A chip-level HDFE is illustrated in FIG. 4. It is to be appreciated that other suitable structures and realizations are possible.

Figure 5:
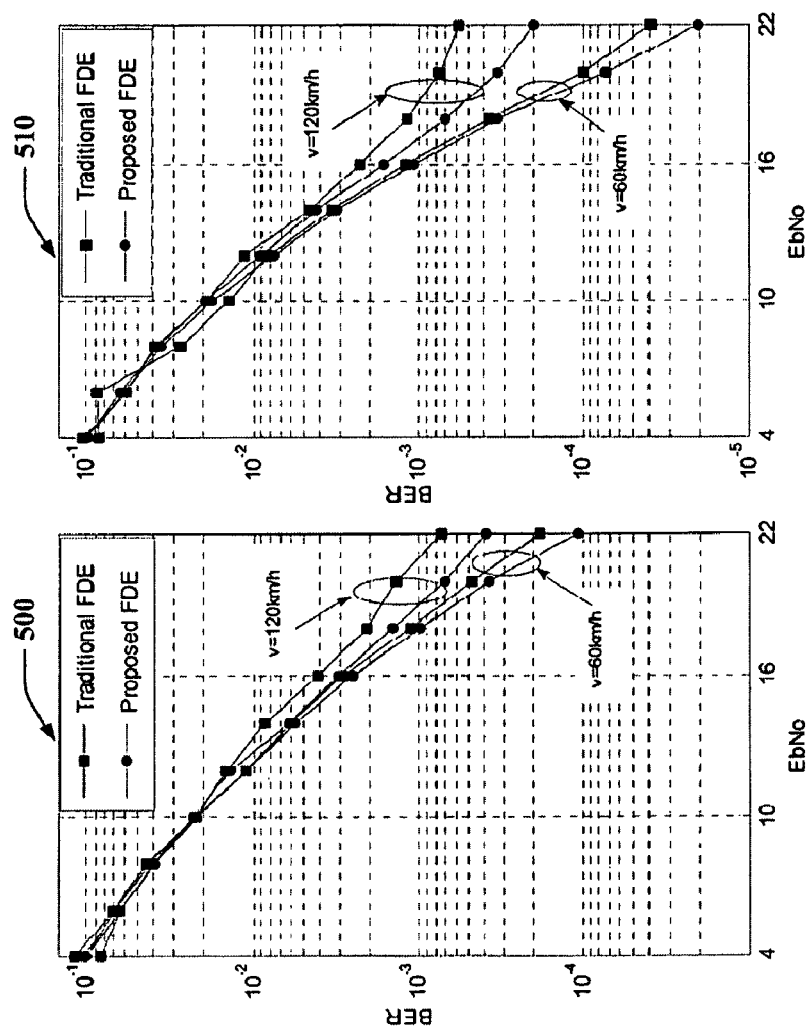
FIGS. 5 and 6 illustrate exemplary performance data for frequency domain equalization.
Figure 6:
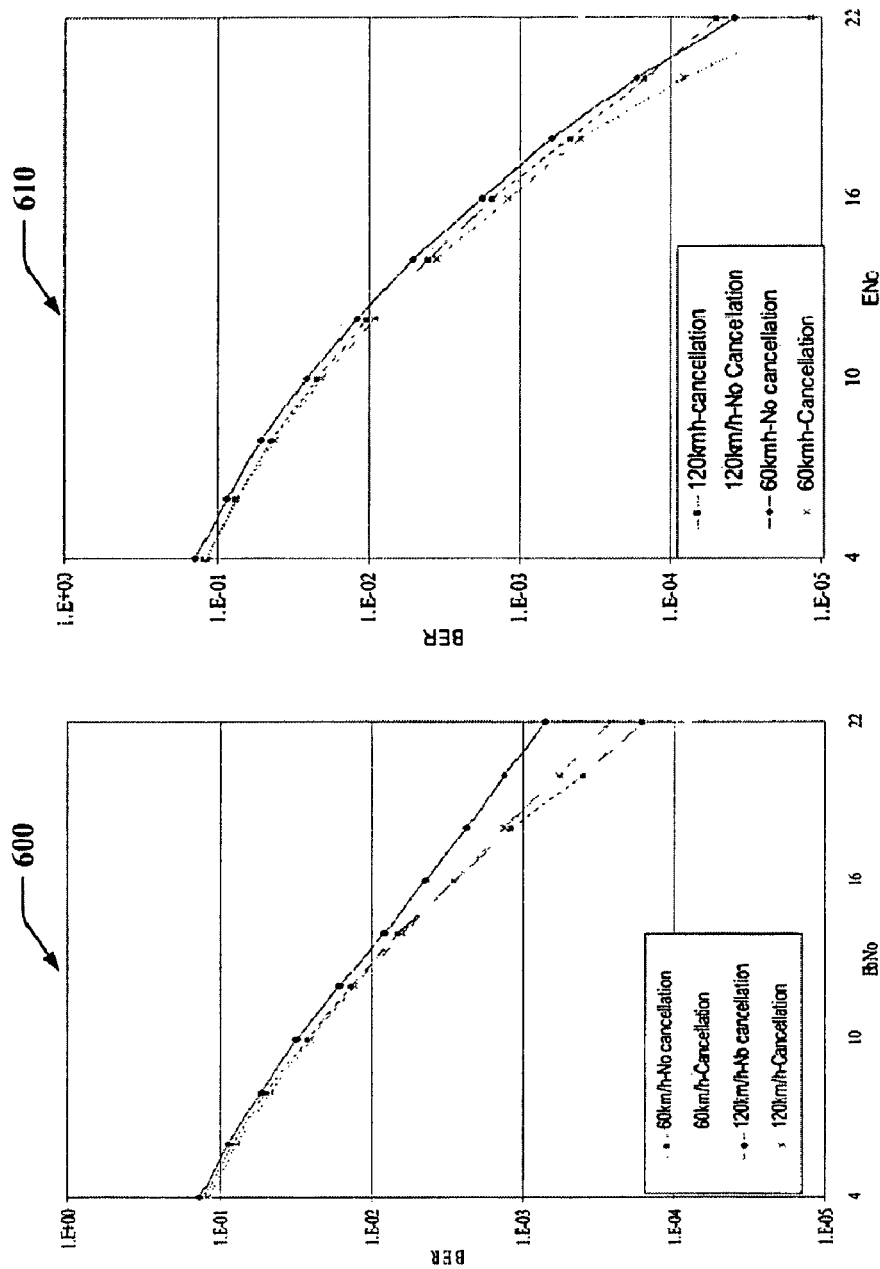

Referring to FIGS. 5 and 6 collectively, example frequency domain performance data is illustrated. Feedback filter coefficients $\{\beta_i\}$ described above can be found by solving a set of linear equation such as:

$$\sum_{l=1}^{N_b} \beta_l \lambda_{m-l} = \lambda_m, \, m = 1, 2, \ldots, N_b \quad (13)$$

where $N_b$ is the number of taps of the feedback filter and $\lambda_m$ is defined as $$\lambda_m = \sum_{k=0}^{P-1} \frac{e^{j2\pi mk/P}}{|H_k|^2 + \sigma_n^2} \quad (14)$$

The feed-forward filter coefficients are express as $$W_k = \frac{H_k^*\left(1 + \sum_{l=1}^{N_b} \beta_l e^{-j2\pi kl/P}\right)}{|H_k|^2 + \sigma_n^2}, \, k = 0, 1, \ldots, P-1 \quad (15)$$

Aspects of an exemplary method have been evaluated for a mobile unit traveling at velocities of 60 km/h and 120 km/h and ideal channel estimation is assumed. The simulation results are shown at 500 and 510 of FIG. 5. In a medium speed fading channel (v=60 km/h), a small performance gain is observed. The reason for the moderate gain is that at this velocity and chosen FFT size, the channel gains do not vary much over one data block. The effect of β in equation (4) above is almost negligible. However, when the mobile unit moves at the speed of 120 km/h, the assumption that channel gains remain constant for one block duration is severely violated. By partially eliminating the amount of β, the proposed approach shows better performance than traditional FDE for both FDE structures; FD-LE and chip-level HDFE. Since the performance of the method for FDE in time varying channel can be dependent on the accuracy of detected data in the first step, the chip-level HDFE provides more performance gain than FD-LE in fast fading channel.

Charts 600 and 610 of FIG. 6 illustrate the performance of the algorithm based on practical channel estimation. For unique word (UW) transmission format, the UW is added to the end of each block and can be used as pilot signals to estimate the channel. To achieve more accurate channel estimation, the length of the UW can be extended to 288 chips. Interpolation can be used to obtain the channel coefficients at the data field for the time-multiplexed pilot symbol structure. Thus, the channel estimation may be performed through two steps: First, the channel at UW position is estimated using the multi-stage serial interference cancellation approach. Second, a sync interpolation technique is utilized to obtain the channel gains at the data field. The interpolation time coefficient can be dependent on assumptions made about the channel conditions. For example, if one knows that the maximum user velocity is 120 km/h and the carrier frequency is 2 GHz, then a sync interpolator with 4.5 ms or less between the center and the first null can be appropriate. Any other suitable channel estimation technique can also be used.

Figure 7:
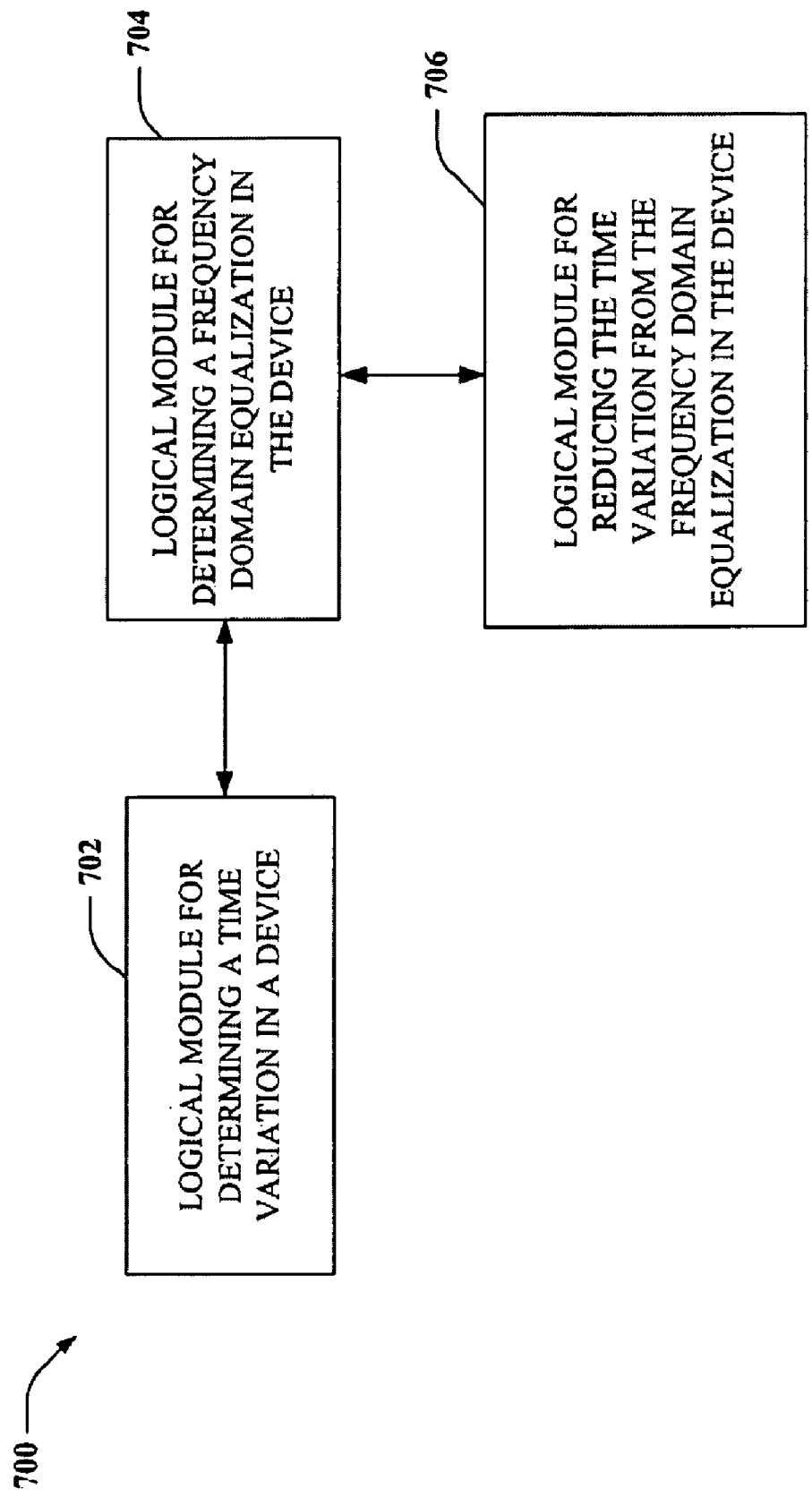
FIGS. 7 and 8 illustrate example logical modules for frequency domain equalization.
Figure 8:
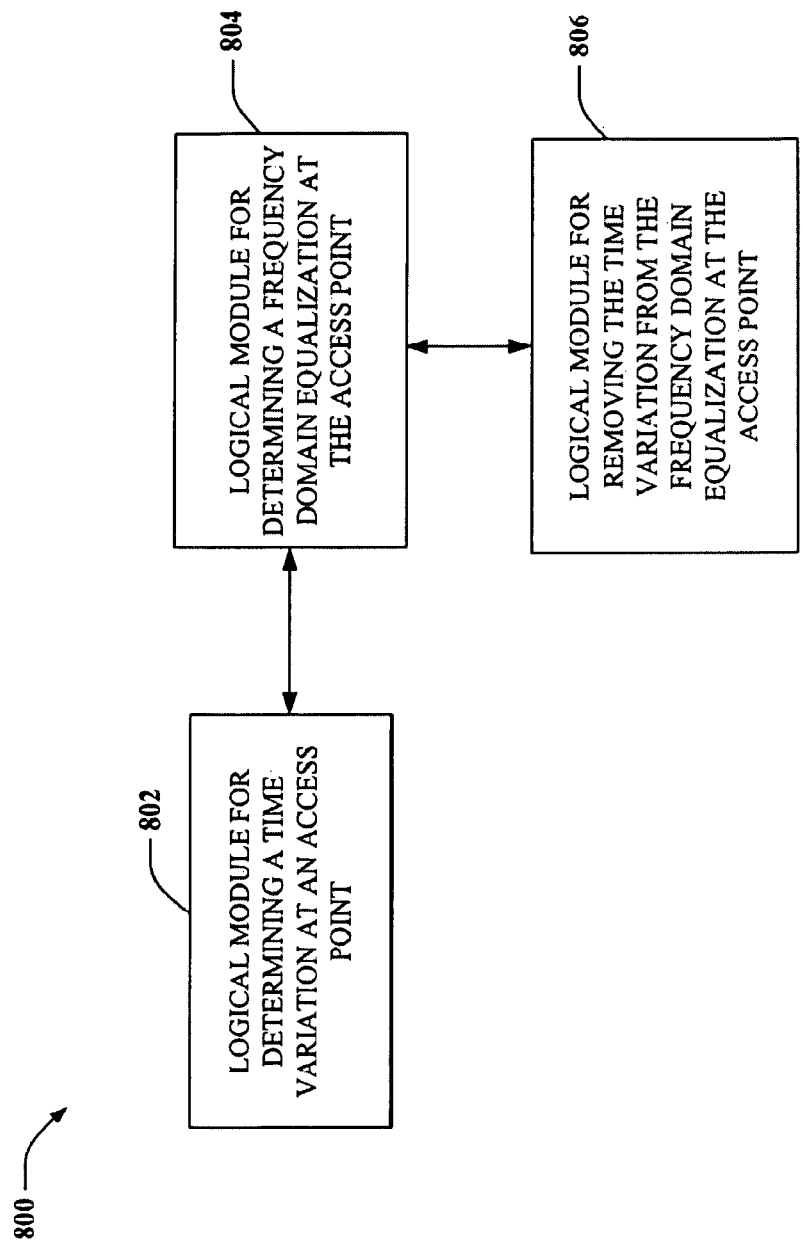

Turning now to FIGS. 7 and 8 collectively, systems are provided that relate to sequence ordering with respect to a terminal, operator networks, access nodes, and traffic flows therewith. The systems are represented as a series of interrelated functional blocks, which can represent functions implemented by a processor, software, hardware, firmware, or any suitable combination thereof.

Referring specifically to FIG. 7, a system 700 that facilitates communications from a mobile device. The system 700 includes a logical module 702 for determining a time variation in a device and a logical module 704 for determining a frequency domain equalization in the device. This also includes a logical module 706 for reducing the time variation from the frequency domain equalization in the device.

Now referring to FIG. 8, a system 800 that facilitates communications from a base station. The system 800 includes a logical module 802 for determining a time variation at an access point and a logical module 804 for determining a frequency domain equalization at the access point. The system 800 also includes a logical module 806 for removing the time variation from the frequency domain equalization at the access point.

Figure 9:
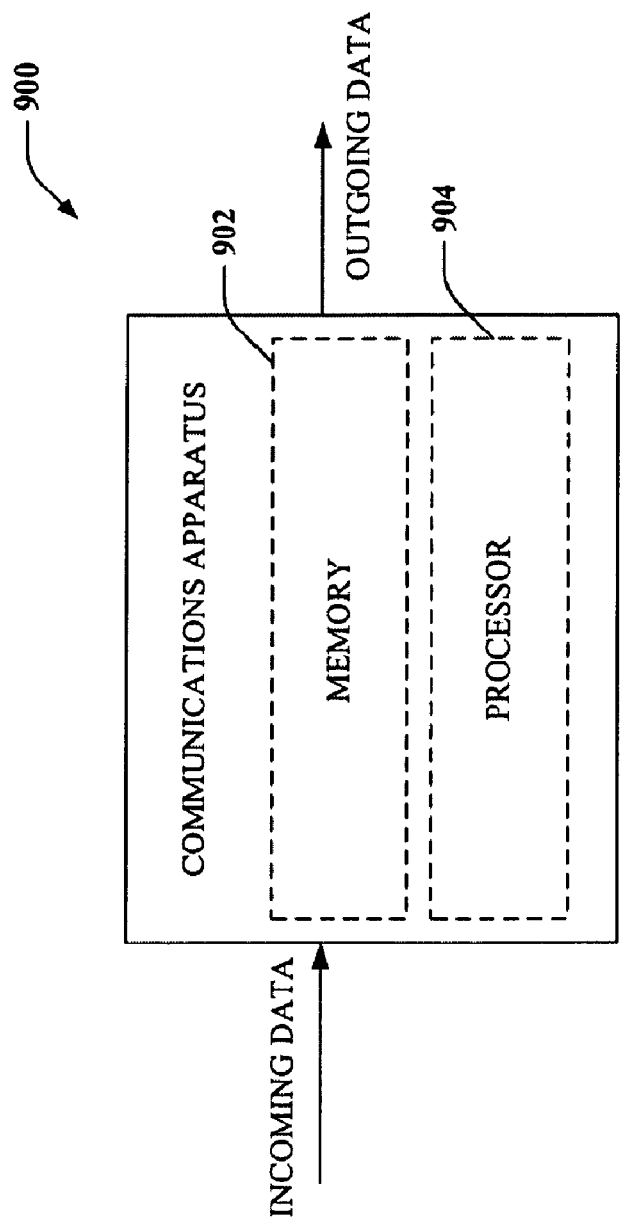
FIG. 9 illustrates an example communications apparatus that employs frequency domain equalization.

FIG. 9 illustrates a communications apparatus 900 that can be a wireless communications apparatus, for instance, such as a wireless terminal. Additionally or alternatively, communications apparatus 900 can be resident within a wired network. Communications apparatus 900 can include memory 902 that can retain instructions for determining a time variation for a received signal in a wireless communications terminal, where the time variation is subtracted from a frequency domain equalization. Additionally, communications apparatus 900 may include a processor 904 that can execute instructions within memory 902 and/or instructions received from another network device, wherein the instructions can relate to configuring or operating the communications apparatus 900 or a related communications apparatus.

Figure 10:
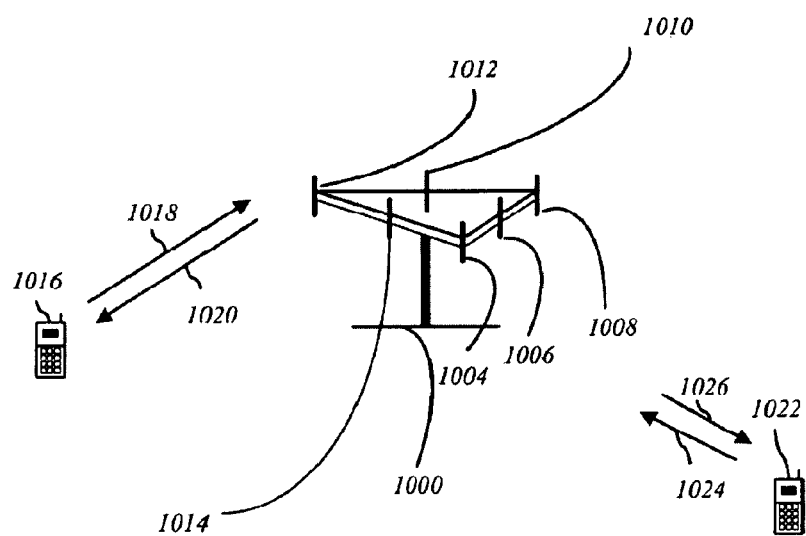
FIGS. 10 and 11 illustrate example communications systems that can be employed with frequency domain equalization components.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
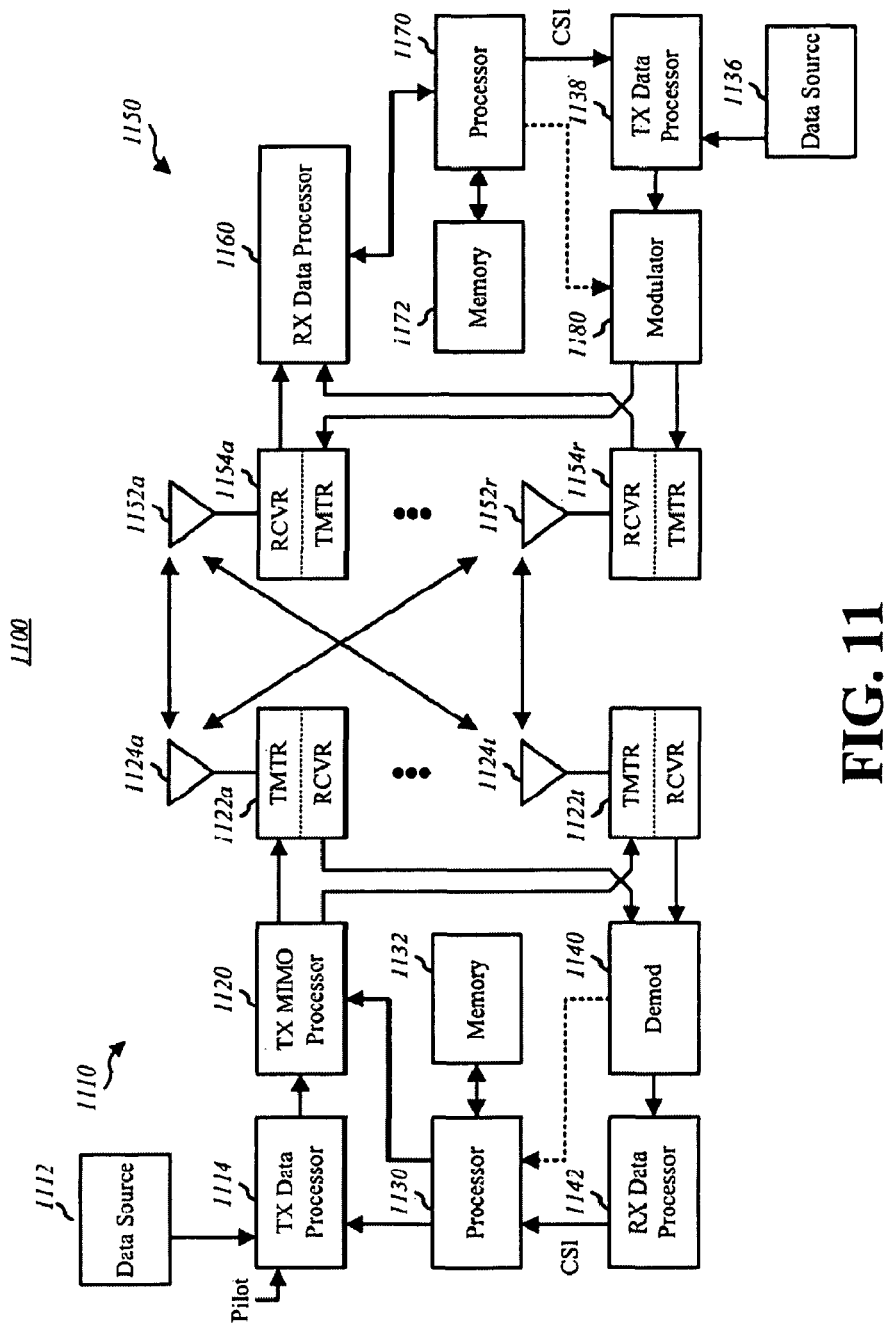

Referring to FIG. 11, a system 1100 illustrates a transmitter system 1110 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

What has been described above includes examples of one or more embodiments. It is of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for a wireless communication terminal, comprising:
estimating a time variation of a channel through which the wireless communication terminal transmits or receives information; and
decreasing the estimated time variation of the channel by subtracting a value representative of a degradation of a corresponding equivalence between the time domain and the frequency domain from a frequency domain equalization (FDE) of a signal transmitted or received by the wireless communications terminal.

2. The method of claim 1, the signal is represented as:

$$r_n = \sum_{l=0}^{p} h_l(n) s_{n-\tau_l} + \eta_n,$$

where
p denotes the number of propagation paths;
$h_l(n)$ is the channel coefficient of l-th path at time index n in the block;
$\tau_l$ is the delay of the l-th path relative to the first path;

$\{s_n\}$ is the sequence of transmitted signals;
$\{r_n\}$ is the received signal; and
$\{\eta_n\}$ is the received noise and other interference.

3. The method of claim 2, further comprising generating a Fast Fourier Transform (FFT) of $r_n$ to generate $R_k$ in the frequency domain.

4. The method of claim 3, wherein the value representative of the degradation of the corresponding equivalence between the time domain and the frequency domain comprises a time varying expression:

$$\beta = \sum_{l=0}^{\rho-1} FFT(f_l(n)\hat{s}_{n-l})$$

where
$f_l(n)$ is a difference between channel coefficients at time n and time zero of l-th path.

5. The method of claim 4, wherein $\beta$ is subtracted in incremental steps from the frequency domain equalization (FDE).

6. The method of claim 5, further comprising performing a time variation cancellation via expression $R_k=R_k-\beta$.

7. The method of claim 6, further comprising forcing a sequence to be periodic via a cyclic prefix.

8. The method of claim 6, further comprising forcing a sequence to be periodic via a unique word extension.

9. The method of claim 1, further comprising employing a threshold value to determine decreasing the estimated time variation.

10. The method of claim 9, the threshold value is associated with a signal quality parameter.

11. The method of claim 9, the threshold value is associated with an iteration number.

12. The method of claim 1, further comprising performing a channel estimation to facilitate a determination of the frequency domain equalization.

13. The method of claim 12, further comprising performing at least one discrete Fourier transform to determine the frequency domain equalization.

14. The method of claim 13, further comprising performing a de-spreading function to generate output from the frequency domain equalization.

15. The method of claim 14, further comprising performing at least a portion of the frequency domain equalization in the time domain.

16. The method of claim 15, further comprising feeding back time domain information into the frequency domain for the frequency domain equalization.

17. A communications apparatus, comprising:
a memory that retains instructions for determining a time variation for a received signal in a wireless communications terminal, where the time variation is decreased by subtracting a value representative of a degradation of a corresponding equivalence between the time domain and the frequency domain from a frequency domain equalization; and
a processor that executes the instructions.

18. The communications apparatus of claim 17, wherein the memory further comprises instructions for iteratively decreasing the time variation.

19. The communications apparatus of claim 18, wherein the memory further comprises instructions for subtracting a portion of the time variation in a frequency domain and a portion of the time variation in a time domain.

20. The communications apparatus of claim 19, wherein the memory further comprises instructions for employing feedback to determine the time variation.

21. A communications apparatus, comprising:
means for determining a time variation in a device;
means for determining a frequency domain equalization in the device; and
means for reducing the time variation by subtracting a value representative of a degradation of a corresponding equivalence between the time domain and the frequency domain from the frequency domain equalization in the device.

22. A machine-readable medium having stored thereon machine-executable instructions for:
determining a time variation in a device;
determining a frequency domain equalization in the device; and
reducing the time variation by subtracting a value representative of a degradation of a corresponding equivalence between the time domain and the frequency domain from the frequency domain equalization in the device.

23. The machine-readable medium of claim 22, further comprising machine-executable instructions for forcing a sequence to be periodic via a cyclic prefix or a unique word extension.

24. The machine-readable medium of claim 22, further comprising machine-executable instructions for performing a portion of a time variation cancellation routine in a frequency domain and a portion of the time variation cancellation routine in a time domain.

25. A processor that executes the following instructions:
determining a time variation from received signals in a device;
performing a frequency domain equalization in the device; and
reducing the time variation by subtracting a value representative of a degradation of a corresponding equivalence between the time domain and the frequency domain from the frequency domain equalization in the device via an iterative process.

26. A method for a wireless communication access point, comprising:
estimating a time variation of a channel through which the wireless communication access point transmits or receives information; and
reducing the estimated time variation of the channel by subtracting a value representative of a degradation of a corresponding equivalence between the time domain and the frequency domain from a frequency domain equalization (FDE) of a signal transmitted or received by the wireless communications access point.

27. The method of claim 26, the signal is represented as:

$$r_n = \sum_{l=0}^{\rho} h_l(n)s_{n-\tau_l} + \eta_n,$$

where
$\rho$ denotes a number of propagation paths;
$h_l(n)$ is a channel coefficient of l-th path at time index n in the block;
$\tau_l$ is a delay of the l-th path relative to the first path;
$\{s_n\}$ is the sequence of transmitted signals;
$\{r_n\}$ is the received signals; and
$\{\eta_n\}$ is the received noise and other interference.

28. The method of claim 27, further comprising generating a Fast Fourier Transform (FFT) of $r_n$ to generate $R_k$ in a frequency domain.

29. The method of claim 28, wherein the value representative of the degradation of the corresponding equivalence between the time domain and the frequency domain comprises a time varying expression:

$$\beta = \sum_{l=0}^{p-1} FFT(f_l(n)\hat{s}_{n-l})$$

where
$f_l(n)$ is a difference between channel coefficients at time n and time zero of l-th path.

30. The method of claim 29, wherein $\beta$ is subtracted in incremental steps from the frequency domain equalization (FDE).

31. The method of claim 30, further comprising performing a time variation cancellation via expression $R_k = R_k - \beta$.

32. A communications apparatus, comprising:
a memory that retains instructions for determining a time variation for a received signal in a wireless communications access point, where the time variation is reduced by subtracting a value representative of a degradation of a corresponding equivalence between the time domain and the frequency domain from a frequency domain equalization; and
a processor that executes the instructions.

33. A communications apparatus, comprising:
means for determining a time variation at an access point;
means for determining a frequency domain equalization at the access point; and
means for reducing the time variation by subtracting a value representative of a degradation of a corresponding equivalence between the time domain and the frequency domain from the frequency domain equalization at the access point.

34. A machine-readable medium having stored thereon machine-executable instructions for:
determining a time variation from received signals at an access point;
determining a frequency domain equalization in accordance with the received signals; and
reducing the time variation by subtracting a value representative of a degradation of a corresponding equivalence between the time domain and the frequency domain from the frequency domain equalization.

35. A processor that executes the following instructions:
determining a time variation from received signals at an access point;
performing a frequency domain equalization from the received signals; and
reducing the time variation by subtracting a value representative of a degradation of a corresponding equivalence between the time domain and the frequency domain from the frequency domain equalization at the access point.

* * * * *